United States Patent
Jeffway, Jr. et al.

(10) Patent No.: US 6,422,942 B1
(45) Date of Patent: Jul. 23, 2002

(54) VIRTUAL GAME BOARD AND TRACKING DEVICE THEREFOR

(76) Inventors: Robert W. Jeffway, Jr., 37 Front St., Leeds, MA (US) 01053; Gary Silverman, 1601 Salem St., North Andover, MA (US) 01845; Howard R. Tarnoff; Lynn Tarnoff, both of 5625 S. Balboa Dr., New Berlin, WI (US) 53151

( * ) Notice: Subject to any disclaimer, the term of this patent is extended or adjusted under 35 U.S.C. 154(b) by 0 days.

(21) Appl. No.: 09/481,090

(22) Filed: Jan. 11, 2000

Related U.S. Application Data

(60) Provisional application No. 60/117,733, filed on Jan. 29, 1999.

(51) Int. Cl.⁷ .................................................. A63F 9/24
(52) U.S. Cl. ......................................... 463/31; 273/236
(58) Field of Search ................................ 463/2, 30–32, 463/34, 37, 46; 273/236, 237, 284, 287; 345/163, 164, 157, 341, 167

(56) References Cited

U.S. PATENT DOCUMENTS

| | | | |
|---|---|---|---|
| 4,103,895 A | 8/1978 | Pressman et al. | 273/153 R |
| 4,107,642 A | 8/1978 | Crummett | 338/128 |
| 4,311,310 A | 1/1982 | Dankman et al. | 273/109 |
| 4,512,567 A | 4/1985 | Phillips | 272/73 |
| 4,538,476 A | 9/1985 | Luque | 74/471 XY |
| 4,575,086 A | 3/1986 | Kim et al. | 273/148 B |
| 4,809,979 A | 3/1989 | Skowronski et al. | 273/153 R |
| 4,895,376 A * | 1/1990 | Chiang Shiung-Fei | 273/313 |
| 4,969,647 A | 11/1990 | Mical et al. | 273/85 G |
| 5,050,883 A | 9/1991 | Goldfarb et al. | 273/153 R |
| 5,095,798 A | 3/1992 | Okada et al. | 84/609 |
| 5,435,552 A | 7/1995 | Lui | 273/85 G |
| 5,526,481 A * | 6/1996 | Parks et al. | 395/155 |
| 5,717,414 A * | 2/1998 | Bergsneider et al. | 345/8 |
| 5,815,411 A * | 9/1998 | Ellenby et al. | 364/559 |
| 5,912,660 A * | 6/1999 | Gouzman et al. | 345/163 |
| 6,195,085 B1 * | 2/2001 | Becker et al. | 345/163 |
| 6,219,034 B1 * | 4/2001 | Elbing et al. | 345/158 |
| 6,256,011 B1 * | 7/2001 | Culver | 345/157 |

* cited by examiner

*Primary Examiner*—Joe H. Cheng
*Assistant Examiner*—Kim T. Nguyen
(74) *Attorney, Agent, or Firm*—Fish & Richardson P.C.

(57) ABSTRACT

A self-contained electronic unit includes a physically manipulable housing such as a mouse, a feedback device, and processing electronics. The housing is constructed to be moved in its entirety during use by a user. The feedback device is incorporated into the housing and is configured to communicate, to the user, movement of a virtual object within a virtual environment. The processing electronics are incorporated into the housing, and are configured to generate the virtual environment, to respond to movement of the housing in its entirety, without regard to relative movement of the housing with respect to any stationary attached hardware, by causing movement of the virtual object within the virtual environment. A trackball is contained within the mouse housing, and the processing electronics are configured to respond to direct physical manipulation of the trackball by a user to cause movement of the virtual object within the virtual environment.

48 Claims, 10 Drawing Sheets

IMMOBILIZING PEG

BOTTOM VIEW

MOUSE MODE

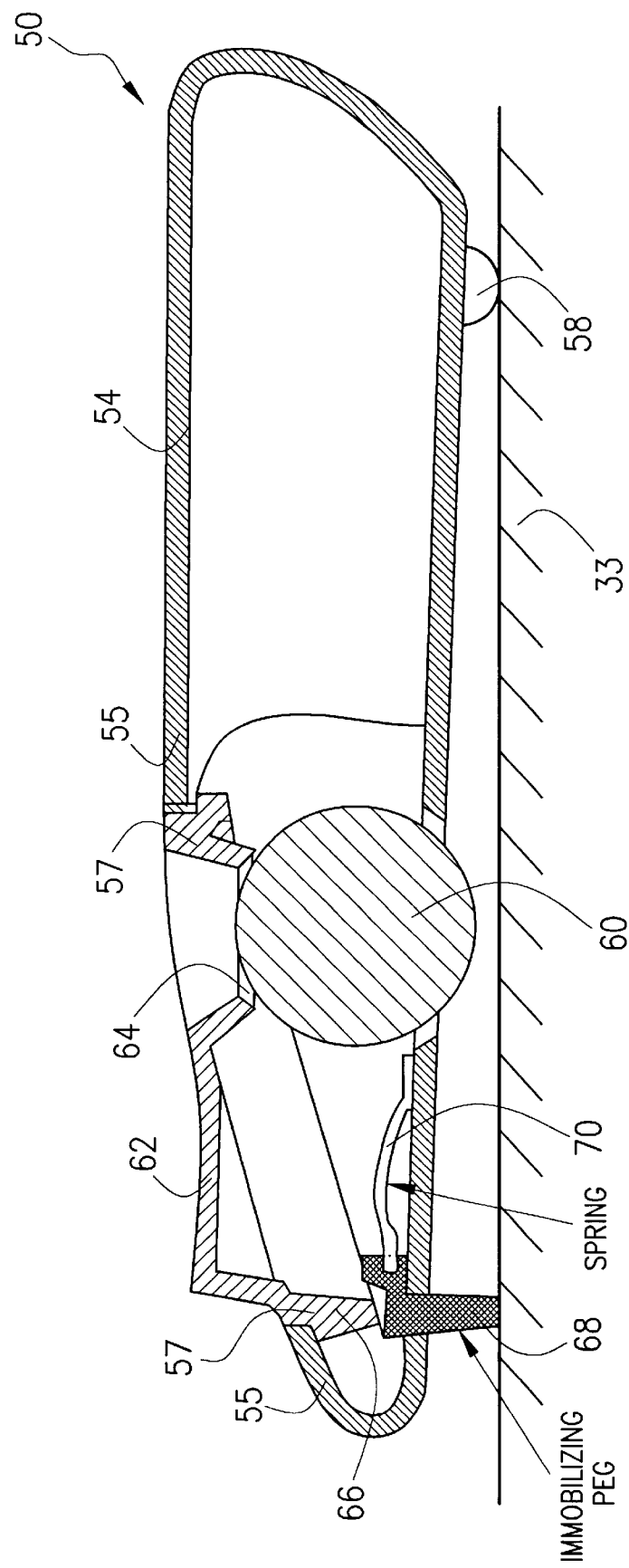
FIG. 10 TRACKBALL MODE

VIRTUAL GAME BOARD AND TRACKING DEVICE THEREFOR

This application is a continuation of Provisional Application 60/117,733 filed Jan. 29, 1999.

BACKGROUND OF THE INVENTION

1. Field of the Invention

The present invention relates to interactive virtual games and particularly portable interactive game units, and to a tracking device for control of an interactive virtual game.

2. Description of Related Art

Interactive virtual electronic games have become ubiquitous for players of all ages. Interactive virtual games may be implemented in one of several forms. In one form, the virtual games are implemented in standalone kiosk-type game units commonly found in arcades. In another form, the virtual games are implemented in programs that run in personal computers. With the advancements of electronic components, virtual games have been implemented in portable hand-held units that have many of the similar functions, features and capabilities of the larger game units.

Heretofore, the user interface of the virtual game typically includes a display of the game action and a user-input device, such as a set of buttons for controlling the game action and/or a cursor-positioning device. The display is stationary in reference to the player. The player controls the game action by manipulating the user-input device. Typically, the electronic games have a video or graphical display of a moving background and game icons representing game characters or targets. The player manipulates one or more icons in reference to the background.

Prior to the availability and affordability of virtual electronic games, board games have captured the interests of players of all ages. Typically, board games have a graphical but static background on which the players manipulate game pieces in reference to the background. With the advancements in electronic games, players are losing interests in the more static board games compared to the more dynamic electronic games. However, there are many board games that are still very exciting and offer game plays that have not been matched by electronic games.

Attempts have been made to implement some of the board games into electronic form, i.e., into hand-held electronic units and programs for personal computers. However, except for the fact the board games are implemented in electronic form, they do not offer the same level and type of interactivity, game play and excitement that are unique to board games.

It is desirable to design a new board game that takes advantage of the dynamics of electronic games while maintaining the game play of board games.

SUMMARY OF THE INVENTION

The present invention provides an electronic game board that facilitates the playing of board games with the dynamics of virtual electronic games. In one aspect of the present invention, the virtual game board is implemented in a unit that is movable by the player during game play. The unit displays a representation of its position as it is being moved. In one embodiment, the unit comprises a display panel that displays an image of a section of a spatial background that moves or changes in response to movement of the unit. The unit also comprises a built in position-tracking device that tracks a change in position of the unit, and updates the position representation accordingly. The background image displayed is shifted in reference to such change in position so to give an appearance of the unit moving across a play area. The background image may represent the image of a game board (e.g., a treasure map). Instead of moving game pieces over a game board, the virtual game board unit is moved to display a changing background that represents the area to which the unit has been moved virtually, as if the player has advance her play piece. Sound and physical effects may be provided by the unit in response to certain movements and upon occurrence of certain game events. The unit may be programmed with different games, or structured to accept different game program cartridges. In another embodiment, instead of a display panel, the unit comprises a visual representation (e.g., by LEDs) providing visual clues of the position of the unit relative to a game play arena.

In another aspect of the present invention, a tracking device is designed which may be deployed for implementing the virtual game board and its game functions. In one embodiment, the device comprises a housing containing a position tracking device similar to a track ball, a display and a number of switches for user input. The device may be structured to create sound and physical effects associated with certain events in a game.

BRIEF DESCRIPTION OF THE DRAWINGS

FIG. 10 is a sectional side view of the tracking device of FIG. 7 in the trackball mode.

DESCRIPTION OF THE ILLUSTRATED EMBODIMENTS

The present description is of the best presently contemplated mode of carrying out the invention. This description is made for purpose of illustrating the general principles of the invention and should not be taken in a limiting sense. The scope of the invention is best determined by reference to the appended claims.

Figure 1:
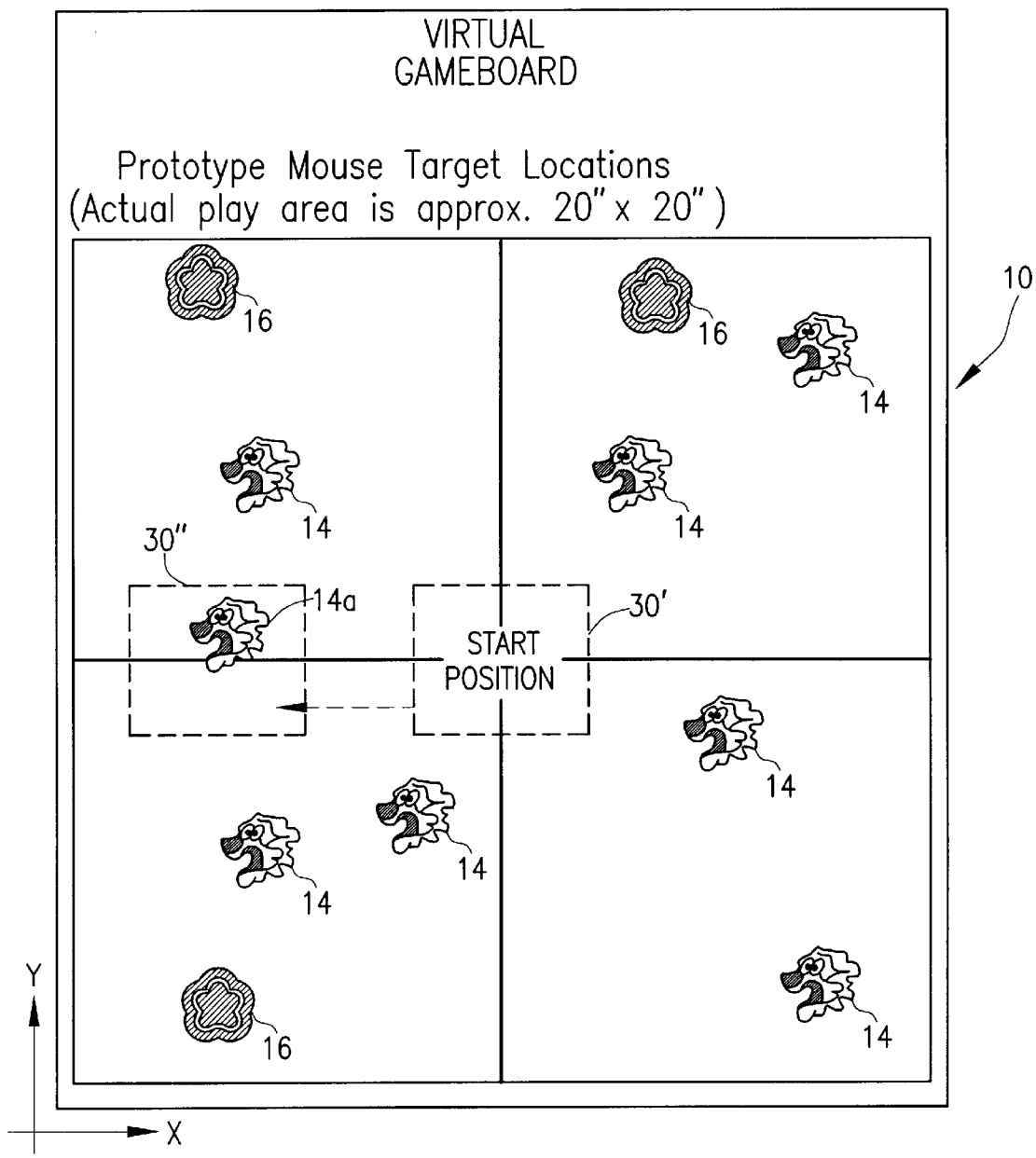
FIG. 1 is a schematic representation of the image of a virtual game board.
Figure 2:
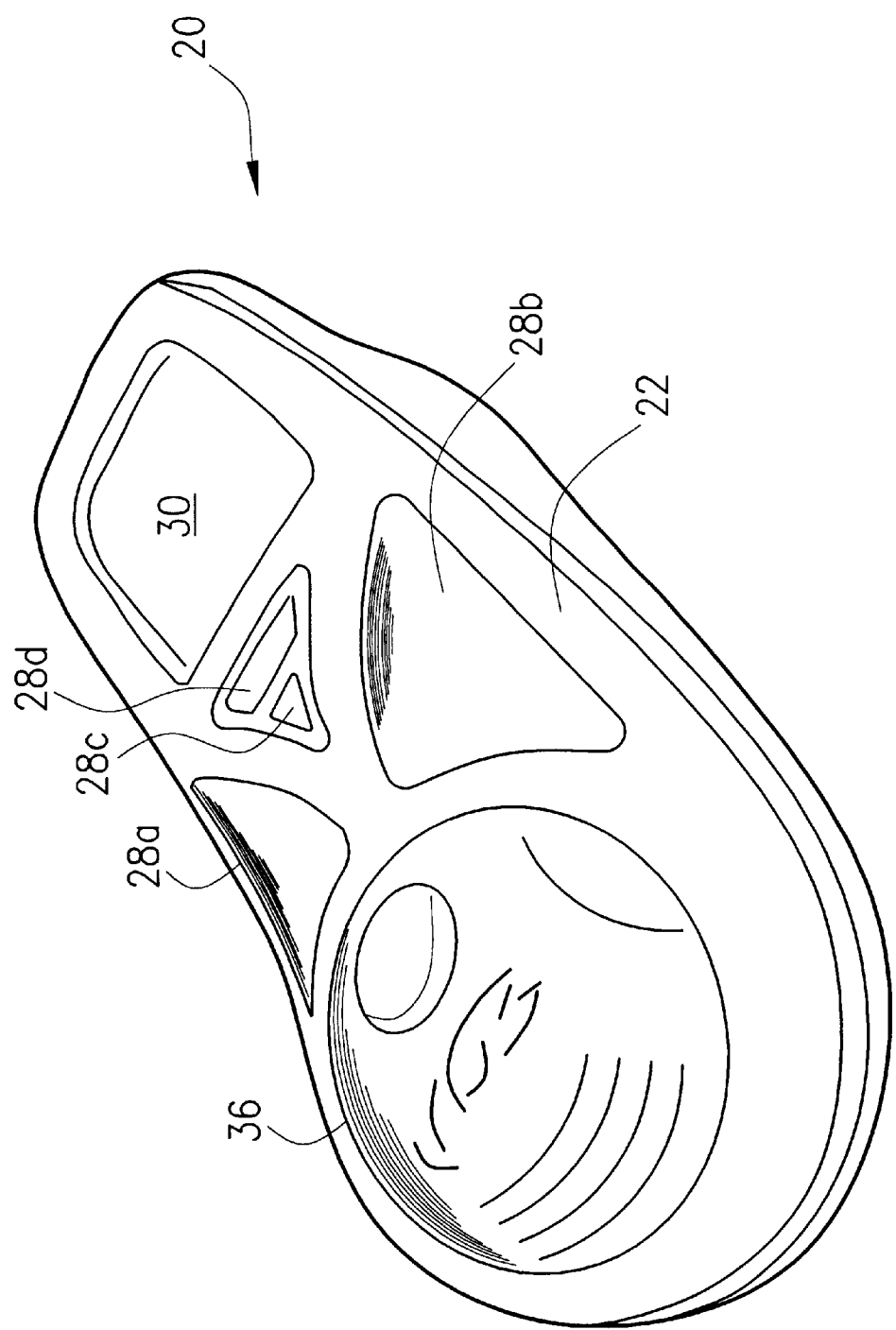
FIG. 2 is a perspective view of a tracking device in accordance with one embodiment of the present invention.
Figure 3:
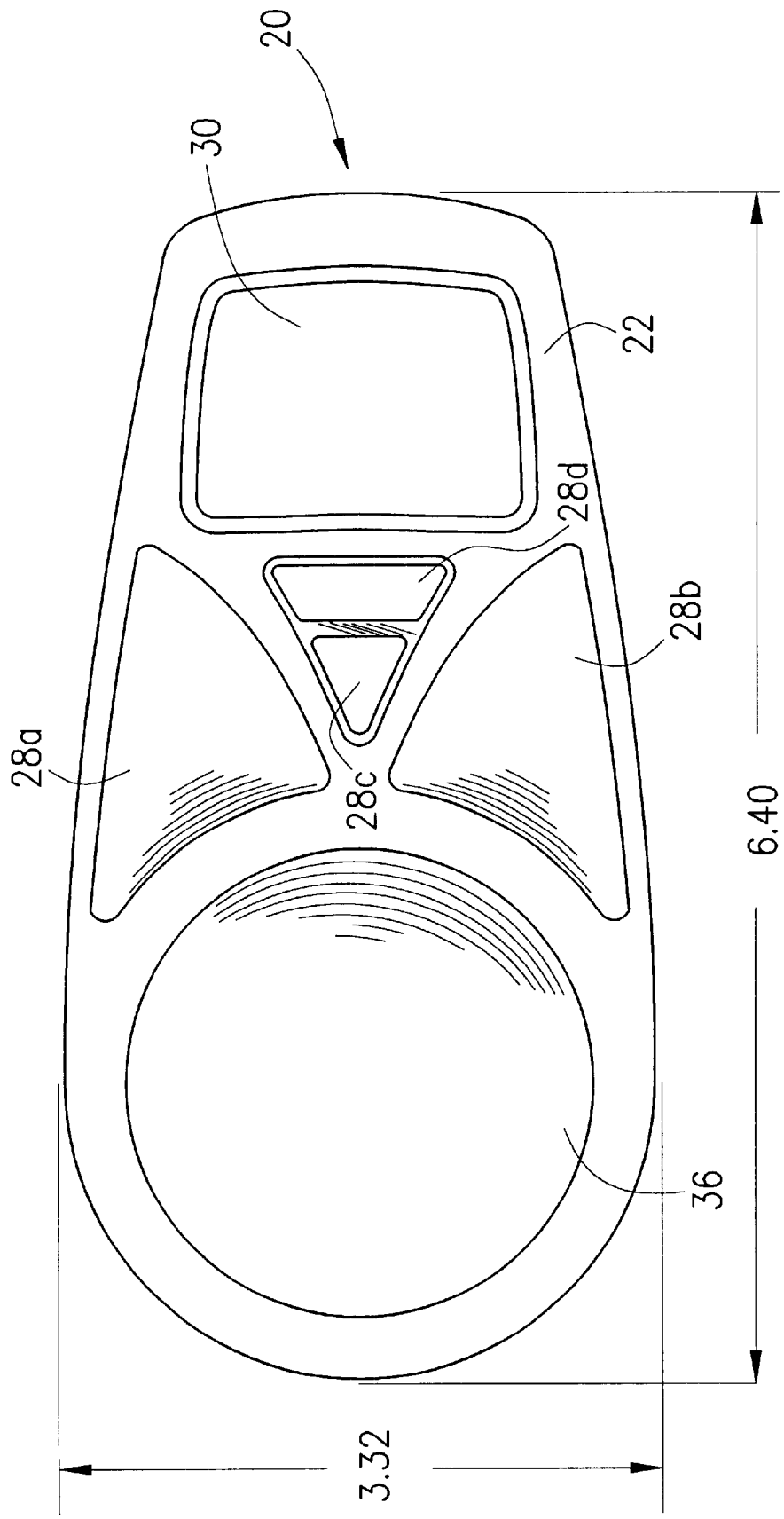
FIG. 3 is a top view of the tracking device of FIG. 2.
Figure 4:
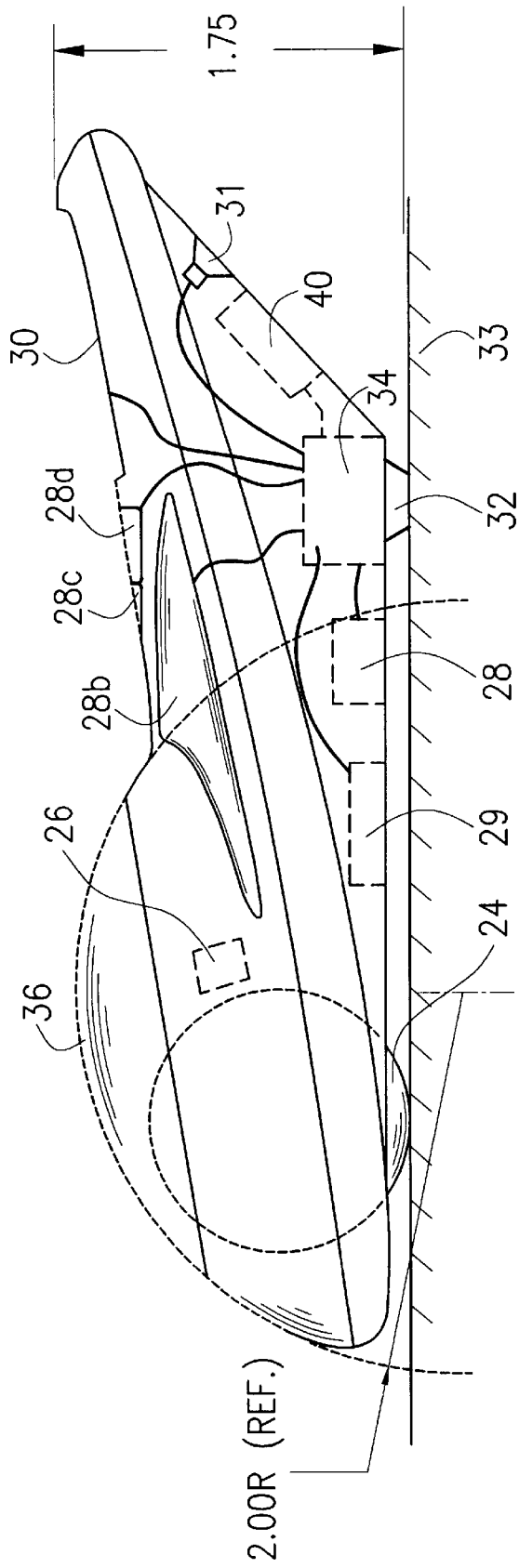
FIG. 4 is a side view of the tracking device of FIG. 2.
Figure 5:
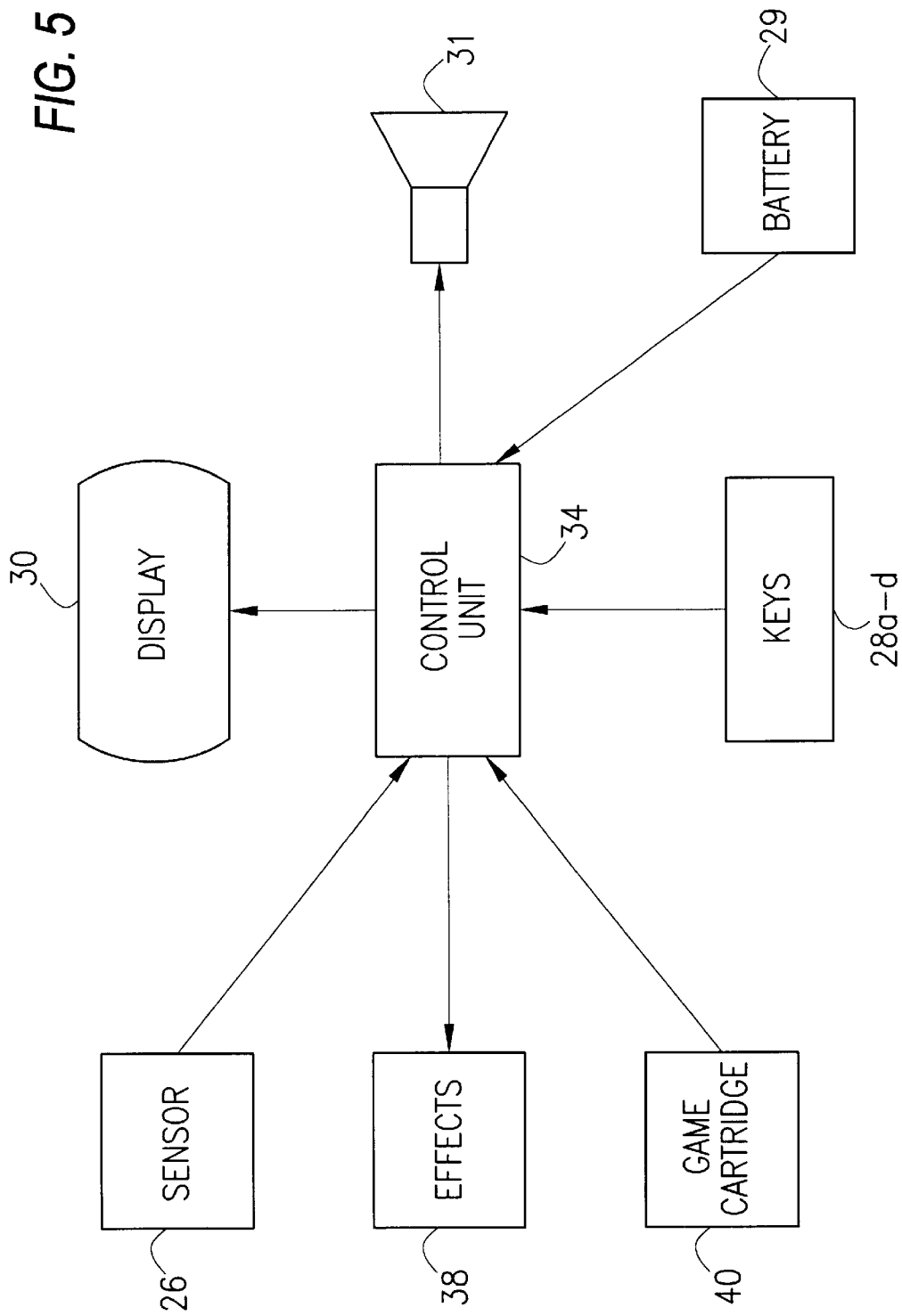
FIG. 5 is a schematic system block diagram of the electronic components of the tracking device of FIG. 2.

FIG. 1 illustrates the overall image representation of one embodiment of a virtual game board 10. In this example, the play area 12 is approximately a 20"×20" square. The objective of the game is to search and destroy the creatures 14. There are obstacles 16 scattered in the play area.

FIGS. 2 to 5 illustrate one embodiment of a tracking device that is adapted for playing the virtual game board 10. The game unit 20 is in essence an improved cursor-positioning device that is commonly to as a "mouse" for use with personal computers. The unit 20 may be slid laterally across a surface 33 by a player and the change in its position is tracked. The unit 20 has a housing 22 contoured to house a ball 24. The ball 24 protrudes from the base of the unit 20 much the same way as a conventional mouse. A pad 32 may be provided at the bottom of the housing at the other end from the ball 24 to facilitate sliding of the unit 20 across the surface 33. Various sensors and electronics 26 are provided in the housing in association with the ball 24 to track movement of the ball 24. Details of these components are not shown in the drawings of discuss herein since they are well known in the art. A number of keys 28a–d are provided at the top of the housing 22, which may be depressed by the player to activate commands associated with the switches, similar to the function of a mouse. The housing also has a display panel 30, which may be a LCD panel (e.g., a 1.5"×1.5" LCD panel) or an LED matrix panel, video display or other display of low power consumption. A speaker 31 (e.g., a 27 mm 8 Ohm speaker) may be provided on the housing for audio output. A battery or a solar panel 29 provides power to the components of the unit 20.

The unit 20 may be converted into a track ball device, also commonly used for personal computers. A cover 36 is provided on the top of the housing 22 to cover the ball 24. By opening or removing the cover 36, the top of the ball is exposed to the player. The player can use her finger to rotate the ball 24 in a manner similar to the user of a track ball device. In the track ball mode, the unit 20 shall be lifted away from the surface 33 so that the ball 24 is no longer in contact of the surface to allow free rotation of the ball. The track ball mode may be operated in the hand held mode. The overall size of the unit 20 illustrated may be in the order of 6.5" long, 3.5" wide and 2" tall.

Figure 6:
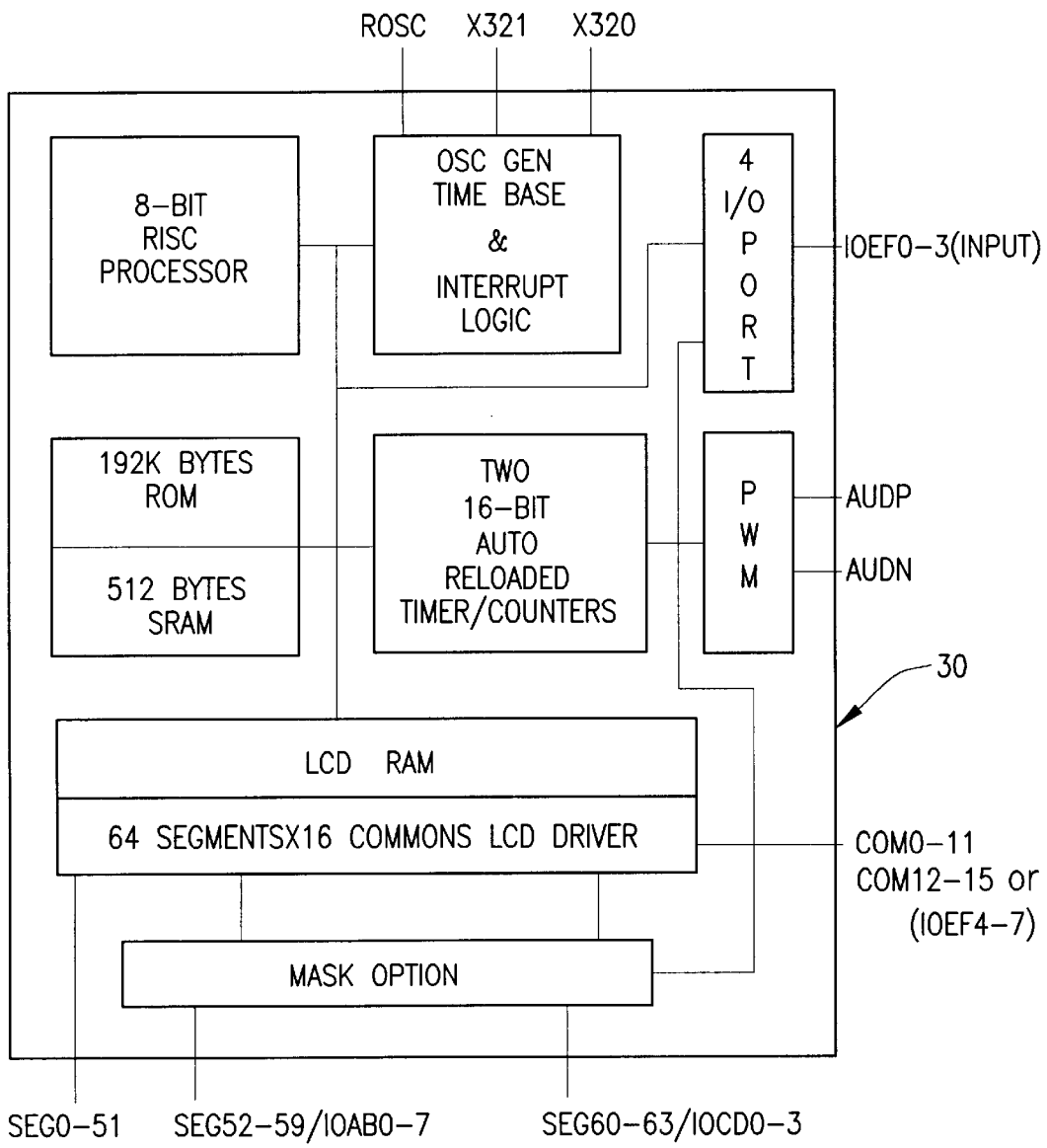
FIG. 6 is a schematic block diagram of the controller unit in accordance with one embodiment of the present invention.
Figure 7:
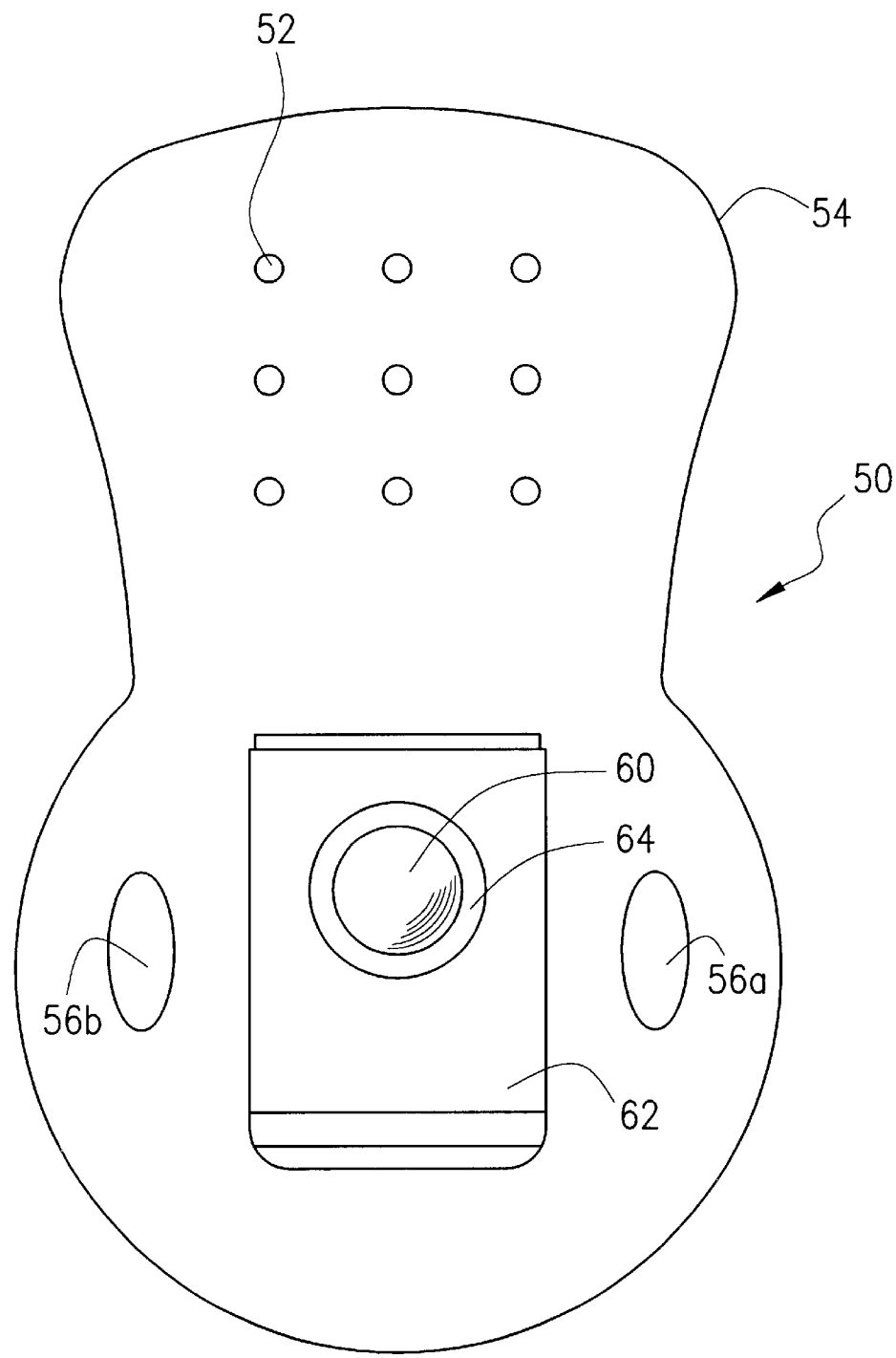
FIG. 7 is a top view of a tracking device in accordance with another embodiment of the present invention.
Figure 8:
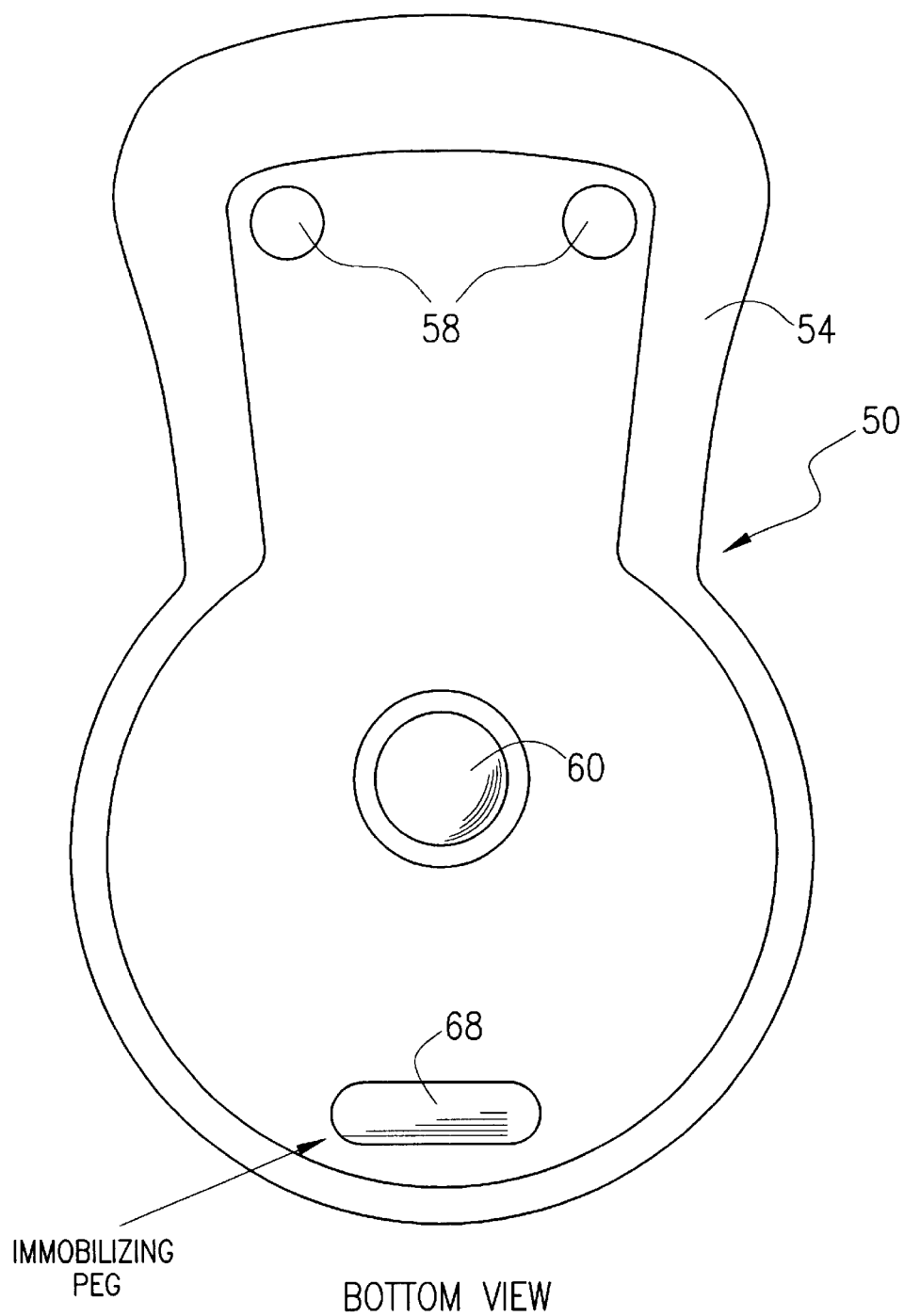
FIG. 8 is a bottom view of the tracking device of FIG. 7.
Figure 9:
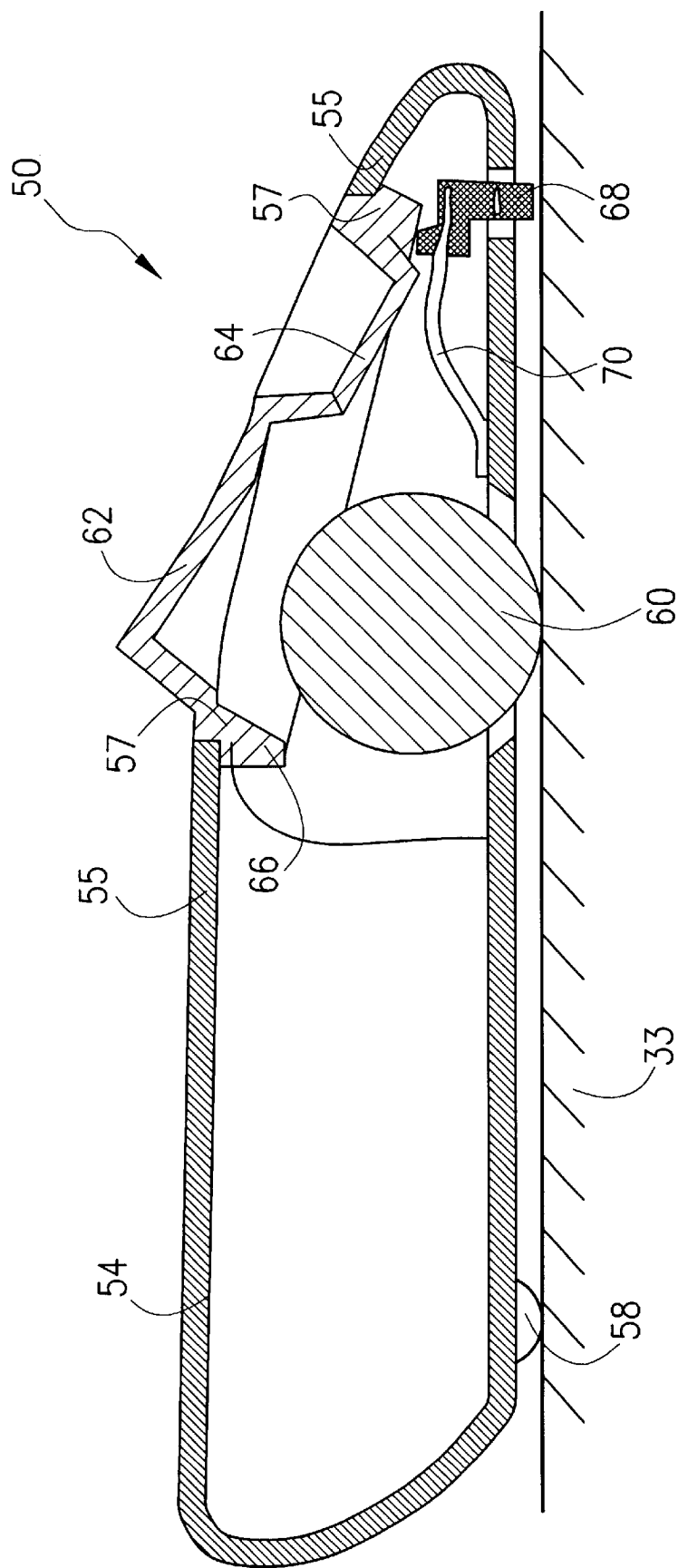
FIG. 9 is a sectional side view of the tracking device of FIG. 7 in the mouse mode.

A control unit 34 is provided, which is programmed to control the game functions, and to control the operations of the speaker 31 and display panel 30. The control unit may incorporate a microprocessor, a sound driver (e.g., a music and voice synthesizer) for the speaker 31, a graphics driver for the display panel 30, other I/O drivers, non-volatile (e.g., ROM), volatile memories (e.g., RAM), and other electronic components structured and configured to achieve the desired functions and features of the present invention disclosed herein. The control unit 34 is programmed with the game rules of one or more virtual games programmed to process game rules provided in external game modules, and to graphical display the play area. The control unit 34 receives inputs from the position sensors 26 and keys 28a–d, and outputs to the display panel 30 and speaker 31 in accordance with the programmed game rules. Details of the configurations of these components have been omitted as they can be easily devised to achieve the features and functions of the present invention without undue experimentation based on the present disclosure. For example and not limitation, a suitable control unit 34 may be a SunPlus SPL190A or SPL190A1 192 KB LCD controller/driver. It is a CMOS 8-bit single chip microprocessor, which contains RAM, ROM, I/Os, interrupt controller, 8-bit PWM audio output and automatic display controller/driver for LCD. FIG. 6 is a schematic diagram representative of one embodiment of the control unit 34. It is noted that it is within the scope and spirit of the present invention to use, instead of a single chip controller, separate components to form a control unit that performs the necessary function. The implementation of the virtual game board using the gaming unit 20 will be explained. The image of the play area 12 is stored in the ROM of the control unit 34. Referring back to FIG. 1, the virtual game board 10 covers a planar play area 12 that is too large to be displayed in its entirety by the display panel 30.

The control unit 34 is programmed such that display information corresponding to a section of the play area 12 is retrieved from memory and such section is displayed on the display panel 30 (e.g., the dotted rectangles 30' and 30" in FIG. 1). The screen of the display panel changes continuously (i.e., scrolls) in synchronization with and in proportion to the movement of the unit 20 as tracked by its mouse function enabled by the ball 24 and the associated sensor components 26. The control unit 34 determines the spatial location in the play area in which the unit 20 has virtually moved to in reference to a starting point, and invoke the appropriate game rules for that section (e.g., attacking a creature 14). In other words, the control unit 34 always knows where the unit 20 is no matter how it is moved within the play area 12.

For example, a reference point such as the starting position of the display may be at the center of the play area 12 (at dotted rectangle 30' in FIG. 1). (A calibration routine may be required to define a reference point.) When the player slides the housing of the unit 20 across a surface to the left, the screen changes incrementally in a scrolling action to display the features of the play area to the left of the starting point. The screen will eventually show the presence of the creature 14a when the unit 20 is slid sufficiently to the left (at dotted rectangle 30" in FIG. 1). The player has a feeling of moving the unit 20 relatively across a game board, but only that the game board is virtually represented by the screen. It is as if the player is looking through a hole or a viewing glass the size of the screen that is scanned across a real game board. When the creature 14a appears on screen, the game rules associated with creature 14a (e.g., destroy by firing a shot at the creature 14a) is invoked and the control unit 34 awaits an input from the player. The game requires the player to press one of the keys 28a–d to execute a fire command, for example. A cross-hair indicia (not shown in figure) may be provided on the display to facilitate aiming. When the unit 20 moves to the location of an obstacle 16 in the play area, the game may direct the player to take a different path. Sound or visual warning and/or instructions may be provided.

It is noted that the movement of the unit 20 and the apparent movement of the play area do not need to be at the same speed. In other words, the control unit 34 may be configured that that a 1" movement of the unit 20 results in a 2" movement, for example, of the play area in the display. Accordingly, the unit 20 does not need to be moved 20" to cover the entire width of the 20" play area. Further, the image of the play area displayed may be magnified or reduced from actual size. Depending on the specific game logic of the interactive game programmed in the unit 20, the unit 20 may be moved over unspecified surfaces (e.g., a plain table top) or over a surface having indicia to guide the movement of the unit 20 by the player. The image on the surface may or may not be (which is typically the case) the same as the image of the play area displayed on the screen. For example, the surface may show a road map, and the display screen may synchronously show the commercial establishments (e.g., a restaurant) that are located at various places shown on the map. This is an example of a good reference source and/or teaching/learning tool.

The control unit 34 may be programmed to restrict display of the play area movements in orthogonal directions (i.e., X and Y movements) only. The player moving the unit 20 at an angle off the X-direction would result in an X-direction movement. This configuration is useful for younger children with less manual dexterity and certain applications or games in which incremental movements of the unit 20 should be executed in X-Y directions.

While FIG. 1 shows a static representation of a play area 12, it is within the scope and spirit of the present invention to use a dynamic play area. For example, the game programmed in the control unit 34 may be such that the creatures may be flying across the screen of the unit 20 even in the absence of movement of the unit 20. The player needs to coordinate the relative movements of the unit 20 and the creatures to make a hit.

Additional functions may be programmed into the control unit 34 of the unit 20 to improve game play. Some of the functions may include an option for the player to adjust the play area size, the magnification of the play area, and the relative speed of the screen movements in response to movement of the unit 20. These options may be selected, for example, using on screen menus and selection of the options using the keys 28a–d. The game unit 20 may be configured such that when the display reaches the boundaries of the play area, further movement of the unit 20 beyond the boundary would not change the display. Warning sound or words and phrase may be programmed to be generated by the control unit 34 via the speaker 31.

Further, components 38 may be provided in the unit 20 to generate sound and physical constraints and/or effects to simulate certain physical sensation experienced as a result of certain game movements and upon occurrence of certain game events. For example, the shooting of a creature 14 may result in the sensation of vibration and the sound of explosion. Movement of the game unit 20 towards or over certain obstacles (e.g., obstacle 16 in the play area) may result in the sensation of an impact and/or resistance to the movement simulating a braking sensation. Travel over a virtual bumpy road may result in vibration sensation. The physical restraints and effects may be provided by solenoid or piezo driven actuators acting on the ball 24 and vibration generators acting on the housing. The physical effects may be implemented as an add-on module or cartridge that can be inserted into a slot in the housing.

To provide more flexibility and expandability in game play, the control unit 34 may be programmed to work in conjunction with removable and interchangeable game cartridges 40 that contain instruction sets related to specific games. The housing 22 of the unit 20 is provided with a slot for receiving game cartridges. Upon installing a game cartridge to the game unit 20, the control unit 34 reads and loads the instruction set for processing and control functions required by the game. Instead of program cartridges, the game unit 20 may be configured to receive removable and interchangeable program chips.

FIGS. 7 to 10 illustrates a tracking device in accordance with another embodiment of the present invention that may be adapted as a game unit for playing a virtual game board. The game unit 50 is similar to the previous embodiment in many respects, with the exception that a display panel is not provided in this embodiment. As in the previous embodiment, the unit 50 comprises a housing 54, a set of keys 56a and 56b, pads 58 to facilitate sliding of the game unit on a surface 33, and a ball 60. With the exception of the control unit that must now control the LEDs instead of a LCD display, the internal electronic components may be similar to the previous embodiment and are omitted from the drawings.

The top of the ball 60 is covered by a detachable cover 62, which is used to convert the game unit 50 from a mouse mode to a track ball mode. Comparing FIGS. 8 and 9, in the mouse mode, the cover 62 is positioned with the hole 64 not above the ball 60. The cover 62 is secured on the housing 54 with the edge 57 of the cover 62 engaging the flange 55 of the housing 54. The unit 50 can slide on the surface 33 with the ball 60 rolling on the surface. In the track ball mode, the cover is turn 180° around to position the hole 64 about the ball 60 so that the top of the ball is exposed to allow manipulation by a person's finger. The cover 62 may be detached from the housing 54 in the mouse mode by squeezing or bending the cover 62 to disengage the edge 57 to the flange 55. The cover should be made of a pliant material such as plastic to allow the flexibility of doing so. The cover 62 has a lip 66 at the end away from the hole 64, which extends downward pressing against a peg 68 during the track ball mode. The peg 68 is biased against downward movement by a spring 70, but under the pressure from the lip 66, the peg 68 is forced to extend downwards through a hole 72 at the bottom of the housing 54. The peg 68 is sized so that in its extended state, it supports the housing 54 on the surface 33 with the ball 60 lifted away from touching the surface 33. The peg 68 functions also to immobilize the lateral movement of the housing 54. In the mouse mode, the cover 62 is turn the other way so that the lip is no longer pressing on the peg 68. The peg 68 retracts into the housing under the bias of the spring 70 so that the peg 68 does not support the housing 54 on the surface 33. Consequently, the ball 60 touches the surface 33.

This embodiment of the game unit 50 adds another challenging game feature. Because a screen is not provided in this unit, the player is required to remember object placements on a randomly generated, invisible game play area. It is as if the game is being played in total darkness with help coming only from the audio and/or visual clues given by the LEDs on the game unit 50. Within a selected game play area, the unit 50 would always know where it is no matter how it is moved. If the mouse is moved to a virtual edge of the board, it will emit a sound indicating so (e.g., slammed into a wall sound). Visual indication of game play may be provided by a set of LEDs 52 positioned on the top of the housing 54. The LED corresponding to the direction of movement may be lit to visually alert the player of what lies ahead.

While the invention has been described with respect to the described embodiments in accordance therewith, it will be apparent to those skilled in the art that various modifications and improvements may be made without departing from the scope and spirit of the invention. For example, game units described herein may be implemented as a cursor-positioning device (e.g., a mouse or track ball) for computing applications without departing from the scope and spirit of the present invention. A wire or wireless connection may be provided in accordance with existing art to couple the cursor-positioning device to the computing system. Accordingly, it is to be understood that the invention is not to be limited by the specific illustrated embodiments, but only by the scope of the appended claims.

What is claimed is:

1. A self-contained electronic unit comprising:

a physically manipulable housing constructed to be moved in its entirety, during use by a user;

a feedback device incorporated into the housing, configured to communicate, to the user, changes in distance between a virtual game piece and other virtual objects within a virtual environment, the virtual environment being a virtual game board; and processing electronics, incorporated into the housing, the processing electronics being configured to generate the virtual environment, to respond to movement of the housing in its entirety, without regard to relative movement of the housing with respect to any stationary attached hardware, by causing changes in distance between the virtual game piece and other virtual objects within the virtual environment, and to cause the feedback device to provide feedback to the user through the feedback device, representing changes in distance between the virtual game piece and other virtual objects within the virtual environment.

2. The self-contained electronic unit of claim 1, wherein the movement of the housing is multidimensional and the interaction of the virtual object with the virtual environment is multidimensional.

3. The self-contained electronic unit of claim 1, wherein the physical manipulation of the housing comprises causing rotation of a trackball contained within the housing.

4. The self-contained electronic unit of claim 1, wherein the physical manipulation of the housing comprises moving the housing across a planar surface.

5. The self-contained electronic unit of claim 1, wherein the housing comprises a slot for receiving cartridges.

6. The self-contained electronic unit of claim 1 wherein the housing comprises a slot for receiving program chips.

7. The self-contained electronic unit of claim 1, wherein the housing is further configured to be connected to a computer and used as a cursor positioning input device for the computer.

8. The self-contained electronic unit of claim 1, wherein the housing comprises an electronic mouse.

9. The self-contained electronic unit of claim 8, wherein the housing is configured to allow both mouse functionality and trackball functionality of the unit.

10. The self-contained electronic unit of claim 9, wherein the housing comprises a cover for the mouse ball, which is adjustable to expose the ball to the user to manipulate in a trackball mode.

11. The self-contained electronic unit of claim 1, wherein the feedback device comprises an LED matrix panel.

12. The self-contained electronic unit of claim 1, wherein the feedback device comprises an audio output device.

13. The self-contained electronic unit of claim 1, wherein the feedback device comprises an LCD screen.

14. The self-contained electronic unit of claim 1, wherein the feedback device is a visual feedback device that has variable magnification functionality in representing the virtual environment.

15. The self-contained electronic unit of claim 1, wherein the feedback to the user comprises physical effects that can be felt by the user while the user moves the housing.

16. The self-contained electronic unit of claim 15, wherein the feedback comprises a braking sensation.

17. The self-contained electronic unit of claim 15, wherein the feedback comprises a vibration sensation.

18. The self-contained electronic unit of claim 15, wherein the feedback device comprises solenoid-driven actuators acting on a mouse ball contained within the housing.

19. The self-contained electronic unit of claim 15, wherein the feedback device comprises piezo-driven actuators acting on a mouse ball contained within the housing.

20. The self-contained electronic unit of claim 15, wherein the feedback device comprises vibration generators acting on the housing.

21. The self-contained electronic unit of claim 1, wherein the processing electronics are pre-programmed to perform multiple selectable games representing interaction of a virtual object with a virtual environment.

22. The self-contained electronic unit of claim 1, wherein the processing electronics are configured to alter dimensions of the virtual environment.

23. The self-contained electronic unit of claim 1, wherein the processing electronics are configured to permit one-to-one proportionality between the movement of the housing and the movement of the virtual object within the virtual environment.

24. The self-contained electronic unit of claim 1, wherein the processing electronics are configured to permit variable proportionality between the movement of the housing and the movement of the virtual object within the virtual environment.

25. The self-contained electronic unit of claim 1, wherein the processing electronics are configured to permit only movements of the virtual object within the virtual environment that are orthogonal to a predetermined direction within the virtual environment, while permitting user input that is both orthogonal and nonorthogonal to the predetermined direction.

26. The self-contained electronic unit of claim 1, wherein the virtual object, for which feedback is provided representing its movement within the virtual environment, is the game piece.

27. The self-contained electronic unit of claim 2, wherein the virtual environment is a map.

28. The self-contained electronic unit of claim 1, wherein the housing further comprises at least one key that may be depressed by a user to activate a command.

29. The self-contained electronic unit of claim 28 wherein the command is a fire command.

30. The self-contained electronic unit of claim 28 wherein the command is a selection of an option using an on-screen menu.

31. The self-contained electronic unit of claim 28 wherein the command adjusts size of the virtual environment.

32. The self-contained electronic unit of claim 30 wherein the command adjusts magnification of the virtual environment.

33. The self-contained electronic unit of claim 30 wherein the command adjusts relative speed of screen movements in response to movement of the housing.

34. The self-contained electronic unit of claim 1 wherein the feedback device is configured to communicate, to the user, movement of the game piece within the virtual environment, and the processing electronics is configured to cause the feedback device to provide feedback to the user representing movement of the game piece within the virtual environment.

35. A self-contained electronic unit comprising:
a physically manipulable mouse housing constructed to be held in its entirety during use by a user;
a trackball contained within the mouse housing;
a feedback device incorporated into the mouse housing, configured to communicate, to the user, changes in distance between a virtual game piece and other virtual objects within a virtual environment, the virtual environment being a virtual game board;
and processing electronics, incorporated into the mouse housing, the electronics being configured to generate the virtual environment, to respond to direct physical manipulation of the trackball by a user to cause changes in distance between the virtual game piece and other virtual objects within the virtual environment, and to cause the feedback device to provide feedback to the user representing changes in distance between the virtual game piece and other virtual objects within the virtual environment.

36. The self-contained electronic unit of claim 35, wherein the movement of the housing is multidimensional and the interaction of the virtual object with the virtual environment is multidimensional.

37. The self-contained electronic unit of claim 35, wherein the housing is further configured to be connected to a computer and used as a cursor positioning input device for the computer.

38. The self-contained electronic unit of claim 37, wherein the housing is configured to allow both mouse functionality and trackball functionality of the unit.

39. The self-contained electronic unit of claim 38, wherein the housing comprises a cover for the mouse ball, which is adjustable to expose the ball to the user to manipulate in a trackball mode.

40. The self-contained electronic unit of claim 35, wherein the feedback device comprises an LED matrix panel.

41. The self-contained electronic unit of claim 35, wherein the feedback device comprises an audio output device.

42. The self-contained electronic unit of claim 35, wherein the feedback device comprises an LCD screen.

43. The self-contained electronic unit of claim 35, wherein the feedback to the user comprises physical effects that can be felt by the user while the user moves the housing.

44. The self-contained electronic unit of claim 35, wherein the virtual object is a game piece.

45. The self-contained electronic unit of claim 35, wherein the virtual object, for which feedback is provided representing its movement within the virtual environment, is the game piece.

46. The self-contained electronic unit of claim 35 wherein the feedback device is configured to communicate, to the user, movement of the game piece within the virtual environment, and the processing electronics is configured to cause the feedback device to provide feedback to the user representing movement of the game piece within the virtual environment.

47. A self-contained electronic unit comprising:

a physically manipulable housing constructed to be moved in its entirety, during use by a user;

a feedback device incorporated into the housing, configured to communicate, to the user, movement of a virtual object within a virtual environment, the virtual environment being a virtual game board; and processing electronics, incorporated into the housing, the processing electronics being configured to generate the virtual environment, to respond to movement of the housing in its entirety, without regard to relative movement of the housing with respect to any stationary attached hardware, by causing movement of a virtual game piece within the virtual environment, and to cause the feedback device to provide feedback to the user through the feedback device, representing movement of the virtual object within the virtual environment;

wherein the virtual environment comprises a dynamic play area in which the virtual object moves regardless of user input, the virtual object being distinct from the virtual game piece.

48. A self-contained electronic unit comprising:

a physically manipulable mouse housing constructed to be held in its entirety during use by a user;

a trackball contained within the mouse housing;

a feedback device incorporated into the mouse housing, configured to communicate, to the user, movement of a virtual object within a virtual environment, the virtual environment being a virtual game board;

and processing electronics, incorporated into the mouse housing, the electronics being configured to generate the virtual environment, to respond to direct physical manipulation of the trackball by a user to cause movement of a virtual game piece within the virtual environment, and to cause the feedback device to provide feedback to the user representing movement of the virtual object within the virtual environment;

wherein the virtual environment comprises a dynamic play area in which the virtual object moves regardless of user input, the virtual object being distinct from the virtual game piece.

* * * * *